Oct. 19, 1926.
R. O. STOKES
1,603,995
MEANS FOR OBTAINING A SQUARE MOTION
Filed Dec. 19, 1925      4 Sheets-Sheet 1
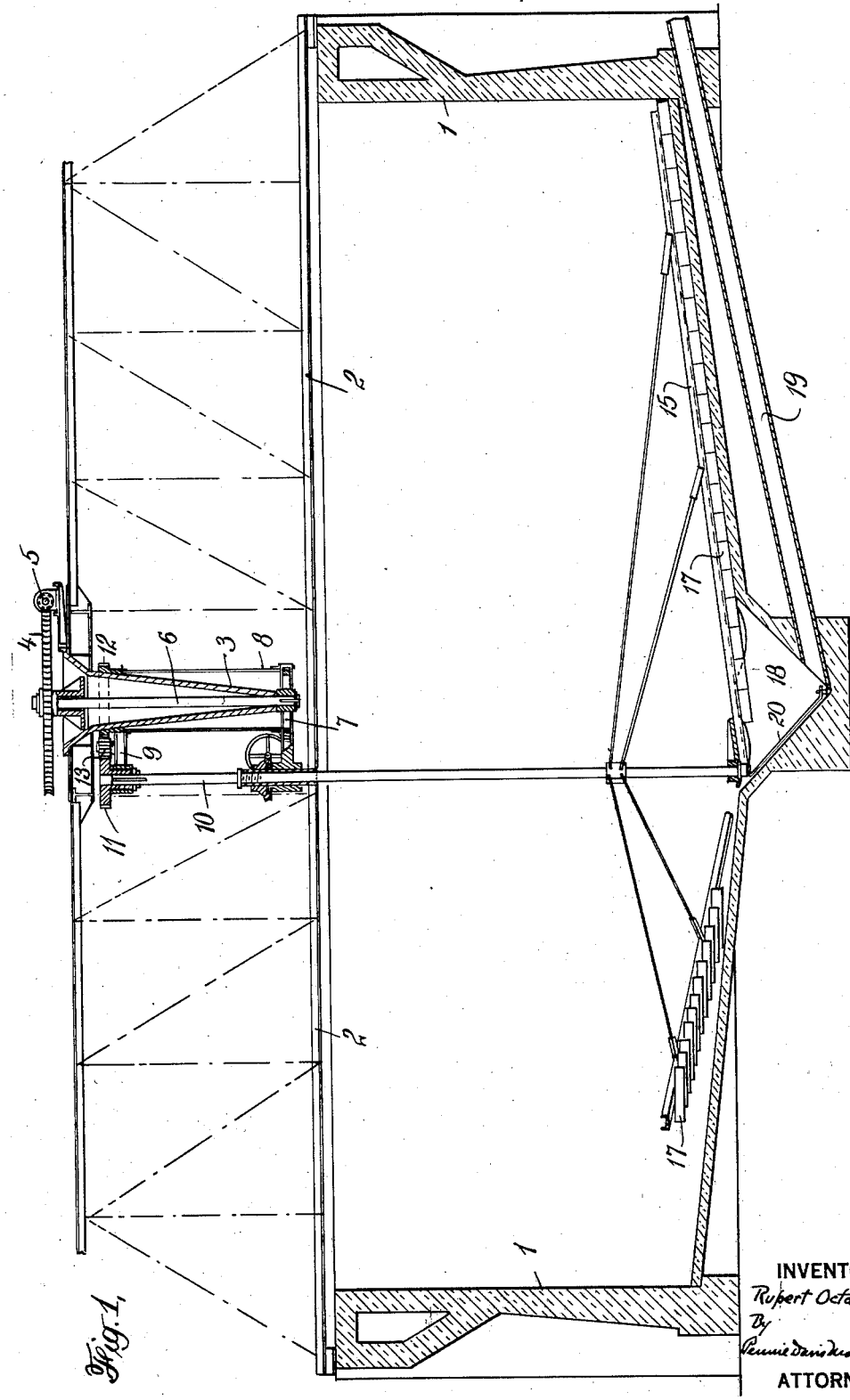
INVENTOR
Rupert Octavius Stokes
By
Pennie Davis Marvin & Edmonds
ATTORNEYS

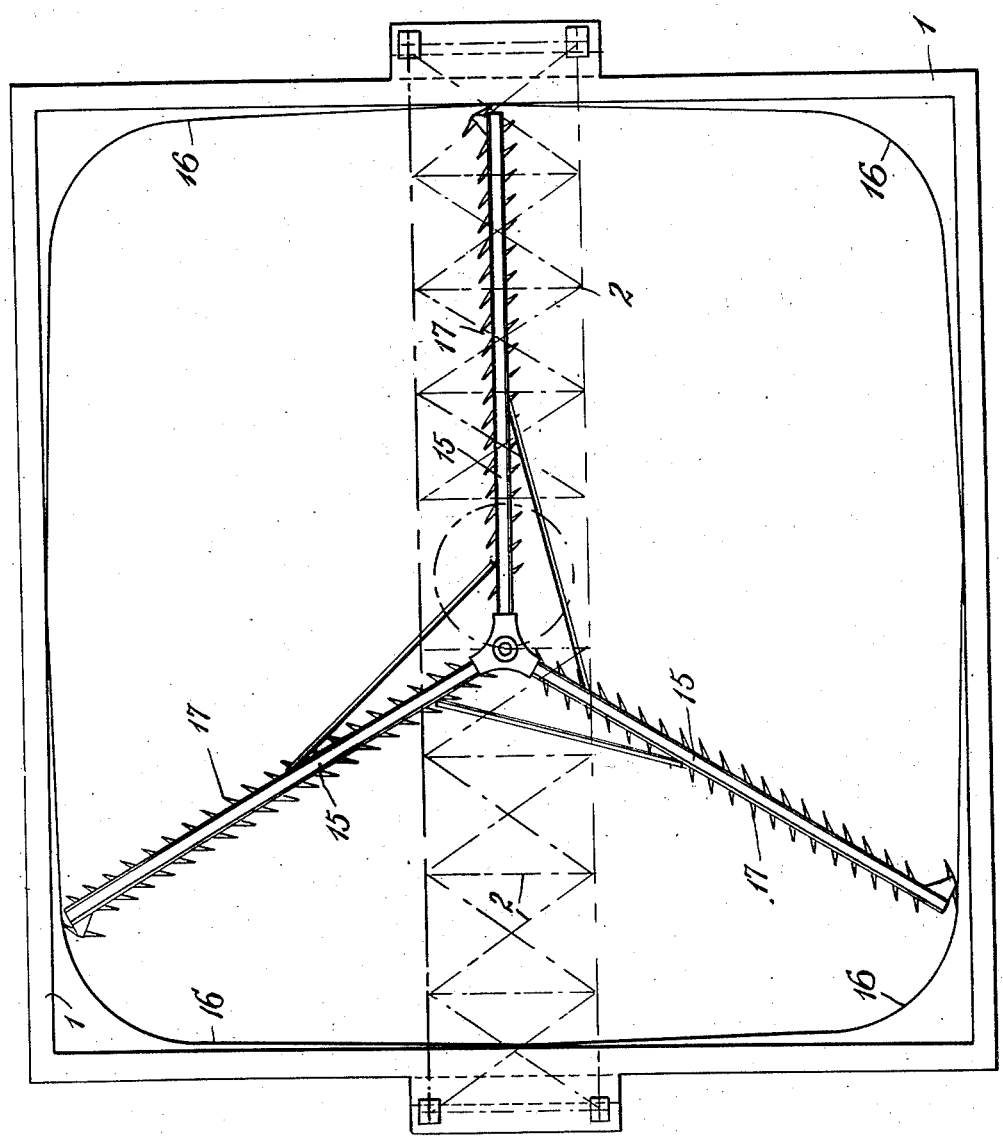

Oct. 19, 1926.
R. O. STOKES
1,603,995
MEANS FOR OBTAINING A SQUARE MOTION
Filed Dec. 19, 1925   4 Sheets-Sheet 3
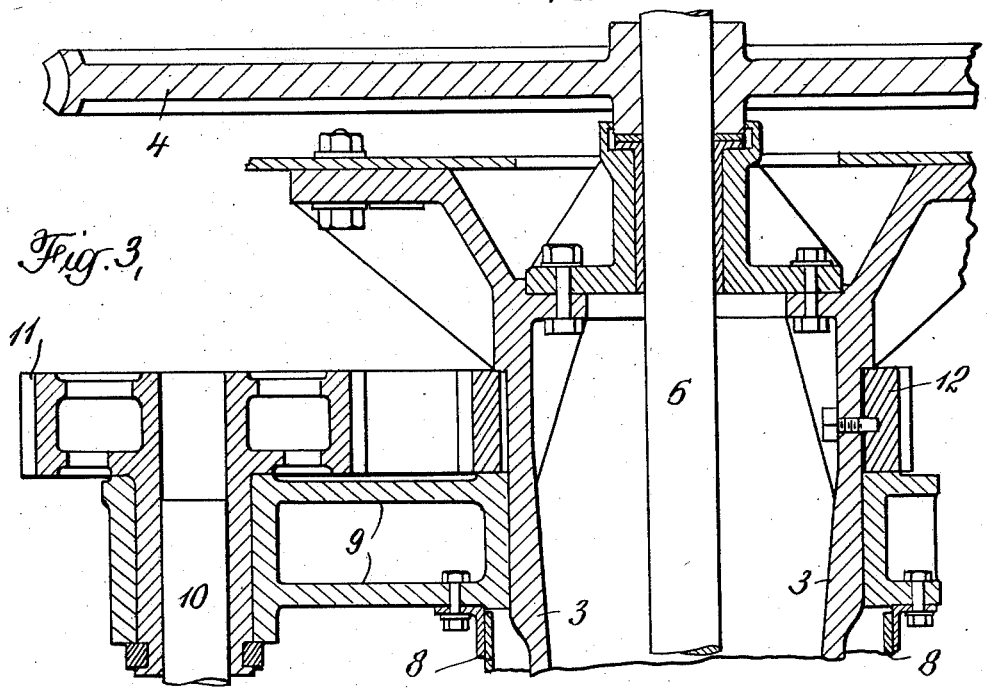
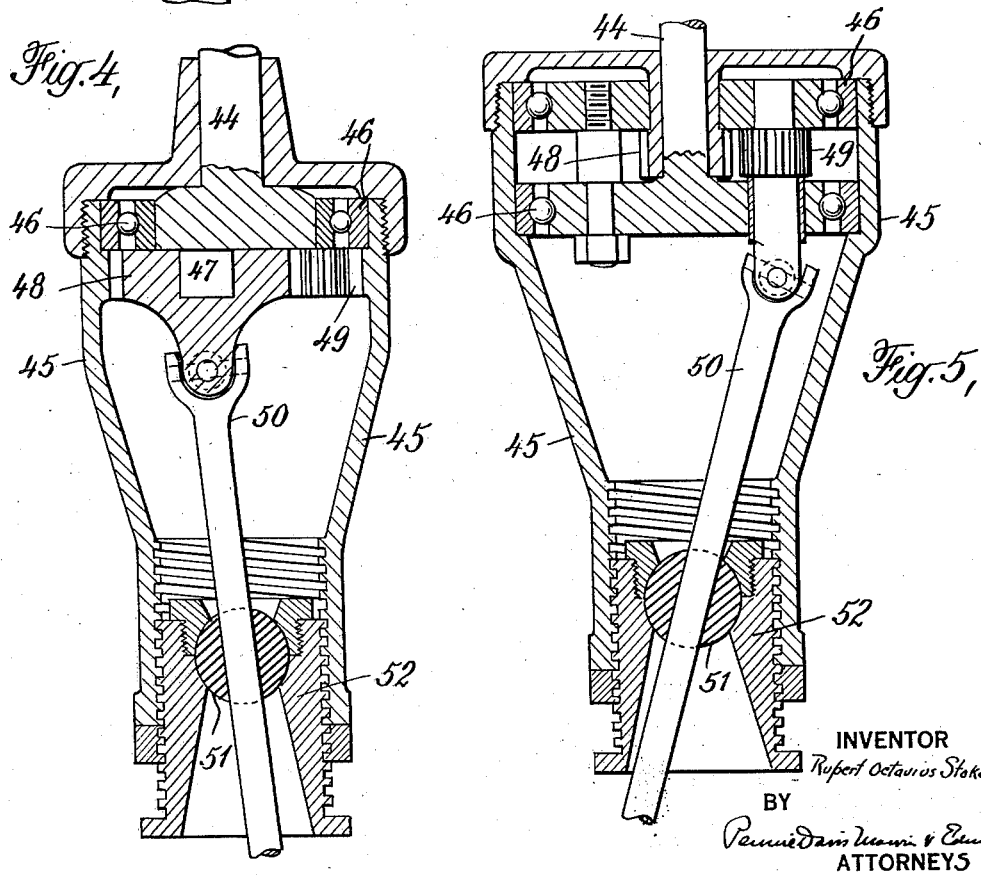
INVENTOR
Rupert Octavius Stokes
BY
ATTORNEYS Oct. 19, 1926.
R. O. STOKES
1,603,995
MEANS FOR OBTAINING A SQUARE MOTION
Filed Dec. 19, 1925    4 Sheets-Sheet 4
Fig. 6,
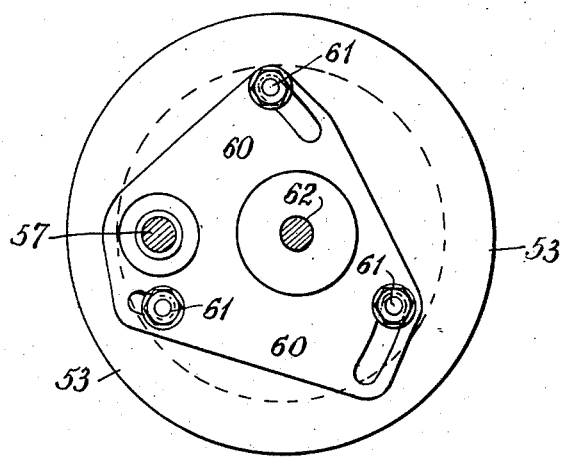
Fig. 7,
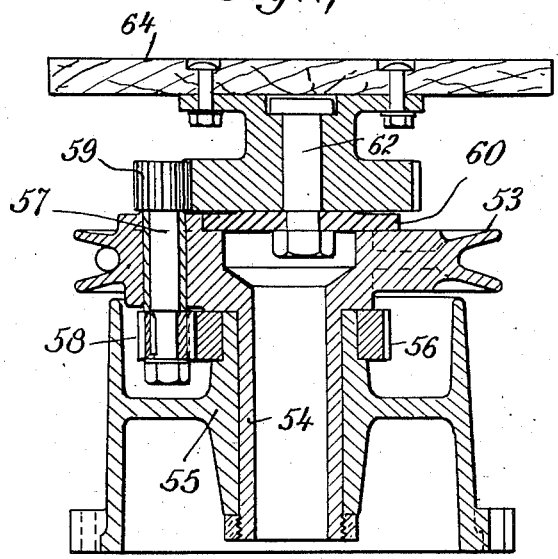
INVENTOR
Rupert Octavius Stokes
BY
ATTORNEYS Patented Oct. 19, 1926.

1,603,995

UNITED STATES PATENT OFFICE.

RUPERT OCTAVIUS STOKES, OF LONDON, ENGLAND.

MEANS FOR OBTAINING A SQUARE MOTION.

Application filed December 19, 1925, Serial No. 76,413, and in Great Britain October 3, 1924.

This invention relates to means for obtaining a substantially square motion, or figure by epicyclic gearing.

The invention is based on the fact that if a rod be mounted so that one end of it describes a circle about a fixed centre while the rod itself revolves in the reverse direction at one third the angular velocity of the above named end about the fixed centre, the free end of the rod will then describe a four-sided figure which if the rod is of the proper length will approximate to a square. The rod may be mounted so that it can turn upon a crank pin which can be revolved round an axis, and I provide means for rotating the rod upon the crank pin in the direction opposed to that of the movement of the crank pin round its axis, at an angular rate which is one third of the angular rate of movement of the crank pin. The free end of a rod of suitable length will describe a curve which approximates to a square. The length of the rod should preferably be seven or eight times that of the crank.

In some cases I may provide two or three rods fast with one another and inclined to one another at 120°, each of which describes the same square figure.

The movement of the rod may be effected, for instance, by rotating about the centre of the square a frame in which is journalled a pin having fast on it the rod, and also a spur wheel meshing with an intermediate wheel which is also journalled in the frame and which meshes with a fixed spur wheel whose axis passes through the centre of the square. In a modification, in which the intermediate wheel is dispensed with, the fixed wheel has internal teeth, and the moving wheel meshes with it directly and is situated inside it. In both cases the fixed wheel has four teeth to every three of the moving wheel. Again the result can be obtained by rotating about the centre of the square an arm in which is journalled a pin having fast on it the rod, and also a sprocket wheel round which passes a chain which also passes round a fixed sprocket wheel whose axis passes through the centre of the square.

Generally, if in such a train the fixed wheel have $km$ teeth, and the moving wheel at the other end of the train have $kn$ teeth, where $k$ is an integer and $m$ and $n$ prime to one another, it may be shown that any point on the rod will describe a figure having $m$ sides, corresponding to $m$ maxima of the distance between the point on the rod and the centre of the fixed wheel. This figure it may also be shown is completed in $n$ revolutions of the frame, after which it repeats. It may further be shown that if, say, a board be fixed to the moving wheel, a point fixed in space will describe upon the board, after $m$ rotations of the frame, an $n$ sided figure. The curvatures of these figures vary according to the ratio of the distance between the centres of the wheels to the length of the tracing arm or to the distance of the tracing point from the centre of the fixed circle, and amongst them are a number with substantially straight sides. By a choice of epicyclic gearing with a suitable gear ratio, polygonal figures having any desired number of sides may be described.

Such mechanism may be used for various purposes, but it is especially applicable for treating material in a square tank, as by its use substantially the whole of the material in a square tank can be reached.

In order to obtain such a square movement in a large tank without the necessity of making the actuating gear as large as would be required by the relationships above given, I may replace the pin by a shaft which is inclined to the axis through the centre of the square, instead of being parallel to it, as is the axis of the pin, and which passes through a fixed spherical bearing, and which has the rod or rods attached to it at a convenient point, which point would follow the movement required by the relationships given above, and apply the actuating gear to the shaft at a point either between such fixed bearing and the rod or rods, or on the side of that bearing remote from the rod or rods, so that the shaft will have a conical motion with the spherical bearing as apex of the cone, the base of the cone being described by the point on the shaft where the rod or rods are attached.

Four-sided figures of a similar kind may also be described by an inversion of some of the mechanisms above described. For instance, if the moving gear wheel above described be fixed while the fixed wheel is caused to rotate, and if a board be mounted on the wheel which was originally fixed, then a point fixed in space and in the plane of the board will describe a four-sided figure on the board.

In the accompanying drawings, which illustrate the invention and some of its applications:—

Figure 1 is a section of a sewage clarifier or the like.

Figure 2 is a plan view of Figure 1.

Figure 3 is a detail of Figure 1 showing the gearing.

Figures 4 and 5 are sections of embodiments applicable to drilling or the like.

Figures 6 and 7 show the application to a potter's wheel or the like.

Referring to Figures 1, 2 and 3, 1 is a square container or tank of any size suitable for clarifying sewage or generally for separating solids from liquids or for other like purposes. 2 is a beam extending across the centre of the tank and carrying at a point immediately over the centre of the tank a support 3 for the gearing. The gearing consists of a worm wheel 4 driven by a screw 5 which rotates a shaft 6 having a laterally projecting crank or arm 7 at its lower end. The crank 7 is connected by a cylindrical or other suitable support 8 to a crank or arm 9 which is parallel to it, and which is carried round with it as it rotates. The cranks are bored to receive a shaft 10 on the upper end of which is splined a gear wheel 11 engaging with a fixed gear wheel 12 through an idle pinion 13. The number of teeth on the wheels 11 and 12 is in the ratio of three to four, thus causing the spindle 10 to rotate at one third the speed of the shaft 6 and in the contrary direction. The shaft 10 carries at its lower end three arms 15 set at 120° apart. The effect of the gearing is that the ends of the arms describe the approximately square curve shown at 16 in Figure 2, and thus explore the corners of the square container. All the arms 15 describe the same figure. The arms are provided with ploughs or plates 17 which collect the sludge on the sloping bottom of the container into a conical pit 18 in the middle, whence it is withdrawn through a pipe 19. The apex of the cone 18 is immediately underneath the spindle 6, and the end of the shaft 10 travels round its base and actuates a scraper 20. The ratio of the length of the crank 7 to that of the arms 15 may vary, a suitable value being one to seven or eight. The splined connection between the spindle 10 and the gear wheel 11 enables the arms 15 to be lifted when required by screw or rack gearing.

Figure 4 shows another mode of applying the principle of the gearing suitable, for example, for drilling holes of approximately square shape. 44 is a rotating spindle passing through a bearing in the cover of a casing 45. An enlargement on the end of the spindle runs in a ball bearing 46 and carries an eccentric pin 47 upon which is pivoted a pinion 48. The pinion is in internal gear with a circular rack 49, which has four teeth to every three of the pinion. The pinion is universally jointed to a rod 50 which passes freely through a ball 51, mounted in a socket 52. The position of the socket 52 may be adjusted in relation to the casing so as to alter the throw of the end of the rod. This rod corresponds to the shaft 10 of Figures 1, 2, and 3, and carries three cutting arms at angles of 120° corresponding to the arms 15.

Figure 5 shows a similar construction. In this case, however, the wheels 48 and 49 gear together externally through an idle pinion which is not shown.

Figures 4 and 5 also serve to illustrate a method of actuating the arms 15 as shown in Figures 1, 2 and 3, by means of gearing of reduced size. The spindle 10 may be passed through a fixed spherical or other universally mounted bearing in line with the shaft 6 and situated either between the gearing and the arms, or on the side of the gearing remote from the arms. The spindle 10 is caused to describe a cone by the motion of the crank 9, and the dimensions of the gearing may thus be reduced in the ratio of its distance from the bearing to the distance between that bearing and the point of attachment of the arms.

Figures 6 and 7 show the same gearing applied to a potter's wheel for making four faced articles. In this form the gearing is inverted, that is to say, the wheel with the smaller number of teeth is fixed while the wheel having the greater number of teeth rotates. The gear ratio is four to three as before.

53 is a belt pulley carried by a vertical sleeve 54 in a support 55, on which is mounted a fixed gear wheel or circular rack 56 having forty-five teeth. The number of teeth is of course immaterial, as long as the ratio 3:4 is maintained. The belt pulley has a bearing for the spindle 57 of two pinions 58 and 59, each having the same number of teeth, the pinion 58 gearing with the rack 56. The belt pulley also carries a plate 60 which is pivoted about the spindle 57 and slotted as shown in Figure 6 to receive bolts 61 by which it can be clamped adjustably to the belt pulley. The plate 60 carries a bolt 62 on which is pivoted the rotating gear wheel 63 having sixty teeth in the case shown. This wheel is in gear with the pinion 59 about whose centre it can be moved, and clamped by the bolts 61 so as to vary its eccentricity. Upon the gear wheel 63 is mounted the table 64 which receives the clay or other substance to be shaped.

In accordance with what has already been stated a dolly applied to the clay will cause a four-faced article to be produced.

What I claim is:—

1. In an apparatus comprising a tank, a frame, an arm mounted for movement within said tank, two wheels mounted on the frame and geared together so that if one of the wheels is caused to make four rotations, the other makes three in the same direction, means for fixing one of the wheels, means for rotating the frame about the center of the fixed wheel, and means carried by the other of said wheels to cause one end of the arm to describe a non-circular path.

2. In an apparatus comprising a tank, an arm mounted for movement within said tank, a frame, two spur wheels mounted on said frame and having the number of their teeth in the ratio of four to three, an intermeshing idle wheel between said wheels, means for fixing one of the extreme wheels, means for rotating the frame about the center of the fixed wheel and means carried by the other extreme wheel for causing one end of the arm to describe a non-circular path.

3. In an apparatus comprising a tank, an arm mounted for movement within said tank, a frame, two spur wheels mounted on said frame and having the number of their teeth in the ratio of four to three, means for fixing the larger of said wheels, means for rotating the frame about the center of said fixed wheel, a shaft coaxial with and rotated by the other wheel, and three arms spaced 120° apart carried by said shaft, and means for causing one end of the arms to describe a non-circular path.

4. In an apparatus comprising a tank of substantially square shape and having a conical bottom, an arm mounted for movement within said tank, a frame supported substantially centrally over said tank, two spur wheels mounted on said frame and having the number of their teeth in the ratio of four to three, an intermeshing idle wheel between said spur wheels, means for fixing one of the extreme wheels, means for rotating the frame about the center of the fixed wheel and means carried by the other extreme wheel for causing one end of the arm to describe a non-circular path within said tank.

5. In combination, a frame, two spur wheels mounted on the said frame having the number of their teeth in the ratio of four to three, an intermeshing idle wheel between the two said wheels, means for fixing the larger of the extreme wheels, means for rotating the frame about the centre of the said larger extreme wheel, a shaft coaxial with and rotated by the other extreme wheel, three arms 120° apart carried by the said shaft, a central pit in the bottom of the tank, ploughs mounted on the said arms for collecting sludge into the said pit, and means for removing the sludge from the pit.

6. Gearing as claimed in claim 3, in which the said shaft is operatively connected by a spline to its coaxial wheel so that it can be raised or lowered.

7. An apparatus comprising a tank, a rigid arm supported to swing within the tank, and means for imparting rotary motion to the inner end of the arm for causing the outer end of the arm to describe a non-circular path.

8. An apparatus comprising a tank, a rigid arm supported to swing within the tank, and means for imparting rotary motion to the inner end of the arm for causing the outer end of the arm to describe a non-circular path, while the inner end describes a circle about the center of the tank.

9. An apparatus comprising a tank, a rigid arm supported to swing within the tank, and means for imparting rotary motion to the inner end of the arm for causing the outer end of the arm to describe a non-circular path, while the inner end describes a circle about the center of the tank in a direction opposite to the direction of movement of the outer end of the arm.

10. An apparatus comprising a tank, having a conical bottom, a rigid arm supported to swing within the tank, and means centrally disposed over said conical bottom for imparting rotary motion to the inner end of the arm for causing the outer end of the arm to describe a non-circular path.

11. An apparatus comprising a tank having a conical bottom, a rigid arm supported to swing within the tank, and means centrally disposed over said conical bottom for imparting rotary motion to the inner end of the arm for causing the outer end of the arm to describe a non-circular path while the inner end describes a circle about the center of the tank in a direction opposite to the direction of movement of the outer end of the arm.

In testimony that I claim the foregoing as my invention, I have signed my name this 20th day of November, 1925.

RUPERT OCTAVIUS STOKES.